R. A. LACHMANN, A. W. RAYMOND & W. B. SENSEMAN.
PULVERIZING APPARATUS.
APPLICATION FILED MAR. 31, 1917.

1,260,407.

Patented Mar. 26, 1918.
3 SHEETS—SHEET 1.

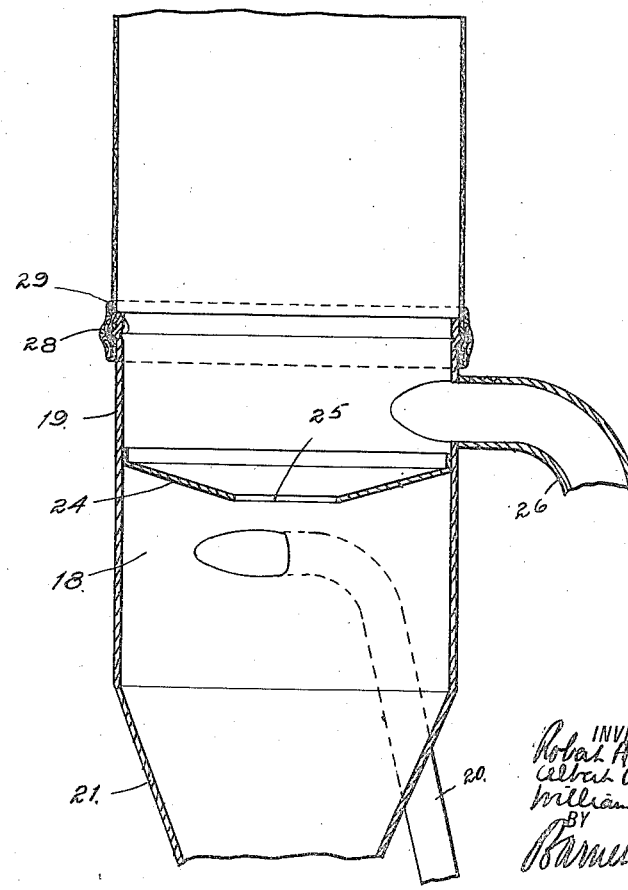

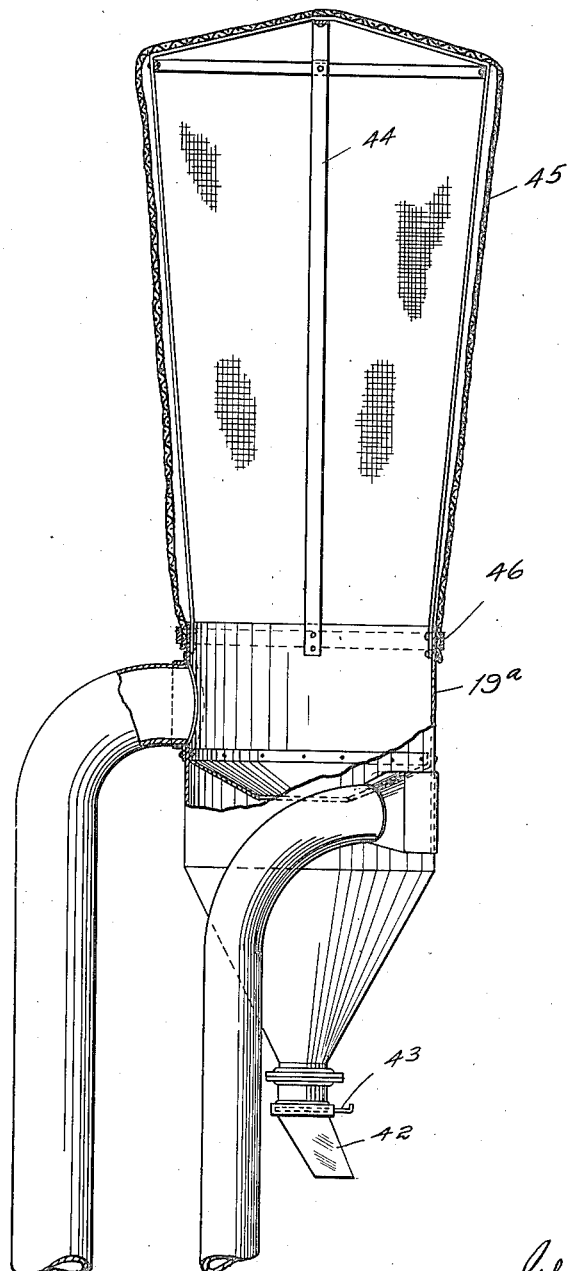

UNITED STATES PATENT OFFICE.

ROBERT A. LACHMANN, OF CHICAGO, ALBERT W. RAYMOND, OF EVANSTON, AND WILLIAM B. SENSEMAN, OF CHICAGO, ILLINOIS, ASSIGNORS TO THE RAYMOND BROTHERS IMPACT PULVERIZER COMPANY, OF CHICAGO, ILLINOIS, A CORPORATION OF ILLINOIS.

PULVERIZING APPARATUS.

1,260,407.  Specification of Letters Patent.  Patented Mar. 26, 1918.

Application filed March 31, 1917. Serial No. 158,892.

*To all whom it may concern:*

Be it known that we, ROBERT A. LACHMANN, ALBERT W. RAYMOND, and WILLIAM B. SENSEMAN, citizens of the United States, residing at Chicago, Evanston, and Chicago, respectively, in the county of Cook and State of Illinois, have invented certain new and useful Improvements in Pulverizing Apparatus, of which the following is a specification.

Our invention relates to pulverizing apparatus of the type involving the discharge of the pulverized product by means of an air current; this invention being concerned particularly with the arrangements for producing and controlling the air passing through the apparatus and for separating the pulverized material from the air current and collecting the same in a suitable receptacle.

One of the principal objects of the invention is to provide a simple, inexpensive and efficient device for separating and collecting the solid matter as it is discharged from the mill.

A further object is to provide certain novel and improved constructions relating to the control of the air through the apparatus. Other incidental objects will appear from the following description of the invention.

The invention is illustrated, in certain preferred embodiments, in the accompanying drawings wherein—

Fig. 2 is a fragmentary view, in longitudinal section, of the dust collector forming part of the machine shown in Fig. 1, and Fig. 3 is a similar view of a modified form of dust collector.

Like characters of reference indicate like parts in the several figures of the drawings.

Figure 1:
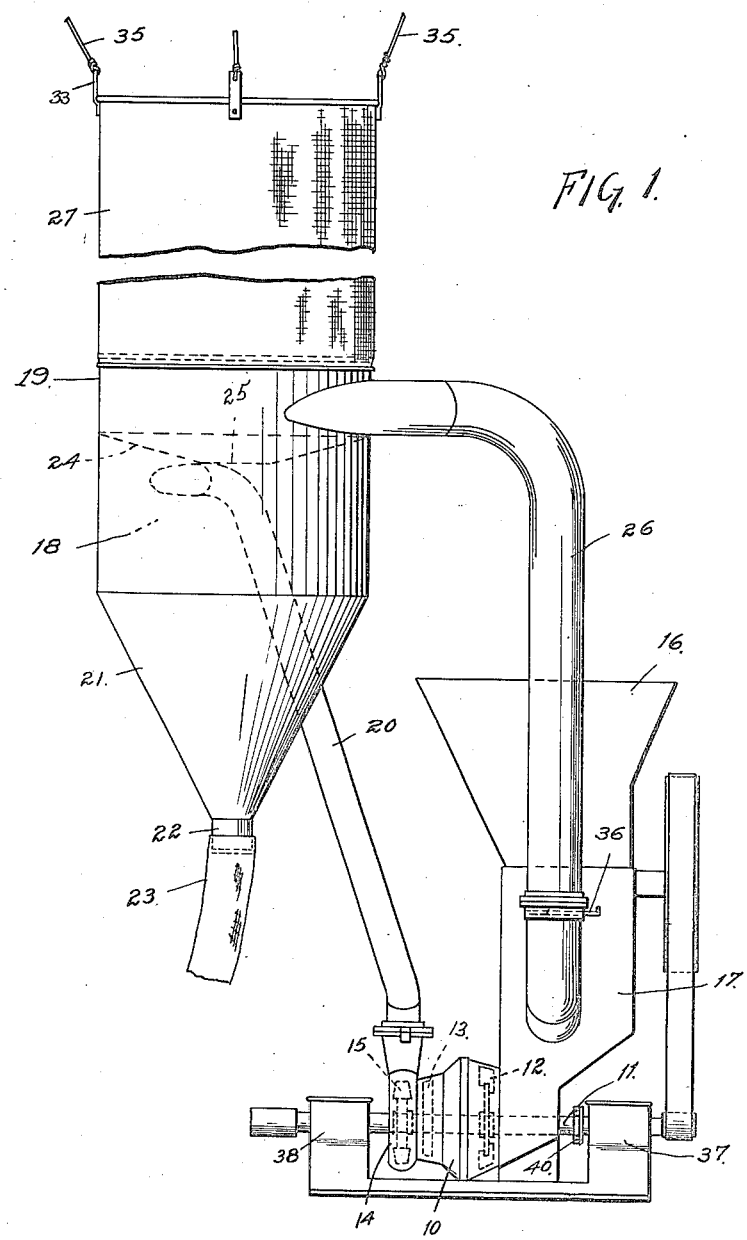
Figure 1 is a fragmentary view, in elevation, of a pulverizing apparatus having the improved features constituting the subject matter of this invention.

This application is a continuation, in part, of our co-pending application Serial No. 57,450, filed October 23, 1915.

Referring to Figs. 1 and 2, which show a pulverizing apparatus of the type disclosed in our pending application referred to, 10 designates the casing forming the pulverizing chamber in which is located on shaft 11 the pulverizing element 12 and regulator 13. 14 is the fan chamber in which is arranged a fan 15. The material is placed in a hopper 16 and enters the pulverizing chamber through a feed spout 17. Preferably certain feed regulating devices are interposed between the hopper 16 and feed spout 17 with which, however, the present invention is not concerned.

The pulverized material is discharged from fan chamber 15 into the collecting chamber 18 of a dust collector 19 through pipe 20. The separating chamber terminates preferably in a tapered funnel 21 having a discharge spout 22 on which is usually arranged a flexible pipe 23, made of cloth, for example, for conducting the material to a barrel or other receptacle. A partition 24 is arranged across the separating chamber. This partition is preferably conical in shape, the inclination of the cone being downwardly toward the center of the collecting chamber, and is formed with a central opening 25. The pipe 20 enters the separating chamber below partition 24 and tangentially of the dust collector so that the air current therefrom, with the pulverized material in suspension, has a circular or whirling movement in the separating chamber. 26 is a pipe which leads from the separating chamber above partition 24 to the feed spout 17 of the pulverizing apparatus, the purpose of this pipe being to return excess of air to the pulverizing chamber of the mill, the air from which is being constantly exhausted by fan 15.

Over the upper end of the separating chamber is arranged a hollow element pervious to air which might be described, in its preferred form, as a cylindrical inverted cloth bag of suitable loosely woven material. The body of the bag 27 is formed with a hem 28 adapted to fit over a rib 29 formed at the upper edge of the separating chamber casing. The upper end of the bag is closed by a cloth closure 30 to the overlapped edge 31 of the body of the bag, the end being stiffened by a metal ring 32. The upper end of the bag is provided with a plurality of tabs 33 provided with eyelets 34 for cords 35 by means of which the bag is supported from the ceiling of the building where the pulverizing apparatus is located.

For controlling the amount of air passing through the apparatus we provide at a suitable point, for example in pipe 26, a slide valve 36.

The main shaft 11 of the pulverizing apparatus is supported in bearing boxes 37, 38 which are spaced at some little distance from the structure forming the pulverizing chamber, fan chamber and feed spout.

Operation: When the mill is started up the fan 15 exhausts the air from the pulverizing chamber 10 and with it the pulverized material of the requisite degree of fineness, depending upon the adjustment of regulator 13. This material is carried through pipe 20 into the separating chamber 18, the stream of air entering the chamber tangentially under partition 24. A whirling movement is set up in the separating chamber which operates to hold the lighter particles in suspension while allowing the heavy particles to subside and be discharged through discharge spout 32. The suction produced by fan 15 exhausts air from the separating chamber above the partition, the exhaust taking place through pipe 26 and being controlled by slide valve 36. The partition 24 prevents the suction through pipe 26 from being exerted directly against the main body of material in the lower part of the separating chamber. Some of the more finely divided material will pass upwardly through opening 25 in the partition and such material is caught by the walls of the bag 27 and falling, will be returned to the lower portion of the separating chamber along the sloping or conical surface of the partition. A certain amount of air will, of course, escape through the bag but the largest volume of air reaching the dust collector will be returned to the pulverizing apparatus by pipe 26. The cloth bag is so connected with the separating chamber casing that it may be conveniently removed when necessary. For example, if the mill is used for grinding different materials, it may be advisable to have a bag for each different material. The bag can be readily freed from adhering dust by striking it occasionally with a stick.

In Fig. 3 we have shown a modified construction of dust collector. The casing 19ª is constructed as before except that the lower end is shown as provided with a spout 42 provided with a slide valve 43. On the upper end of casing 19ª is arranged a framework 44 adapted to support the cloth bag 45 the lower edge of which may be bound to the casing by a band 46.

We claim:

1. A dust collector for pulverizing apparatus, comprising a separating chamber open at the top and provided with a discharge orifice at the bottom, a partition across said chamber formed with a central opening, a pipe for introducing the pulverized material into said separating chamber below the partition, an element pervious to air arranged over the open end of the separating chamber, and an air passage arranged intermediate the said partition and pervious element.

2. A dust collector for pulverizing apparatus, comprising a separating chamber open at the top and provided with a discharge orifice at the bottom, a partition across said chamber formed with a central opening, a pipe adapted to conduct dust-ladened air from the pulverizing apparatus to said separating chamber below the partition, an element pervious to air arranged over the open end of the separating chamber, and a pipe communicating with the separating chamber above the partition and adapted to return air from said chamber to the pulverizing apparatus.

3. A dust collector for pulverizing apparatus comprising a separating chamber open at the top and provided with a discharge orifice at the bottom, a conical, centrally apertured partition in said chamber, the inclination of which is downward toward the center of the chamber and which is formed with a central opening, a pipe adapted to conduct dust-ladened air from the pulverizing apparatus to said separating chamber below the partition, and an element pervious to air arranged over the open end of the separating chamber.

4. A dust collector for pulverizing apparatus, comprising a separating chamber open at the top and provided with a discharge orifice at the bottom, a conical, centrally apertured partition in said chamber, the inclination of which is downward toward the center of the chamber and which is formed with a central opening, a pipe adapted to conduct dust-ladened air from the pulverizing apparatus to said separating chamber below the partition, an element pervious to air arranged over the open end of the separating chamber, and a pipe communicating with the separating chamber above the partition and adapted to return air from said chamber to the pulverizing apparatus.

5. A dust collector for pulverizing apparatus comprising a separating chamber open at the top and provided with a discharge orifice at the bottom, a partition across said chamber formed with a central opening, a pipe adapted to conduct dust-ladened air from the pulverizing apparatus to said separating chamber below the partition, a hollow element vertically disposed over the open end of the separating chamber, and a pipe communicating with the separating chamber at a point intermediate the said partition and hollow element and adapted to return air to the pulverizing apparatus.

6. A dust collector comprising a separating chamber open at the top and provided with a discharge orifice at the bottom, a partition across said chamber formed with a central opening, a pipe adapted to introduce dust-ladened air into said separating chamber below the partition, an inverted cloth bag arranged over the open end of the separating chamber, and means for supporting said bag.

7. A dust collector comprising a separating chamber open at the top and provided with a discharge orifice at the bottom, a conical, centrally apertured partition in said chamber the inclination of which is downward toward the center of the chamber and which is formed with a central opening, a pipe adapted to introduce dust-ladened air into said separating chamber below the partition, an inverted cloth bag arranged over the open end of the separating chamber, a pipe communicating with the separating chamber at a point intermediate the said partition and said bag to return air to the pulverizing apparatus, and means for supporting said bag.

8. A dust collector for pulverizing apparatus, comprising a separating chamber open at the top and provided with a discharge orifice at the bottom, a conical partition in said chamber the inclination of which is downward toward the center of the chamber and which is formed with a central opening, a pipe adapted to conduct dust-ladened air from the pulverizing apparatus to said separating chamber below the partition, an inverted cloth bag arranged over the open end of the separating chamber, means for supporting said bag, and a pipe communicating with the separating chamber above the partition and adapted to return air from said chamber to the pulverizing apparatus.

9. A dust collector for pulverizing apparatus, comprising a separating chamber open at the top and provided with a discharge orifice at the bottom, a conical partition in said chamber, the inclination of which is downward toward the center of the chamber and which is formed with a central opening, a pipe adapted to conduct dust-ladened air from the pulverizing apparatus to said separating chamber below the partition, an element pervious to air arranged over the open end of the separating chamber, and a pipe communicating with the separating chamber above said partition and adapted to return air from said chamber to the pulverizing apparatus.

10. A dust collector for pulverizing apparatus comprising a substantially cylindrical separating chamber terminating at the bottom in a discharge funnel, a conical partition in said chamber, the inclination of which is downward toward the center of the chamber and which is provided with a central opening, a pipe having a substantially tangential opening into the separating chamber and adapted to conduct dust-ladened air from the pulverizing apparatus to said chamber, a pipe communicating with the separating chamber above the partition and adapted to return a portion of the said dust-ladened air to the pulverizing apparatus, a cloth bag, and means for supporting the same over the upper open end of said separating chamber.

11. A dust collector for pulverizing apparatus, comprising a substantially cylindrical separating chamber terminating at the bottom in a discharge funnel, a conical partition in said chamber, the inclination of which is downward toward the center of the chamber and which is provided with a central opening, a pipe having a substantially tangential opening into the separating chamber and adapted to conduct dust-ladened air from the pulverizing apparatus to the said chamber, a pipe communicating with the separating chamber above the partition and adapted to return a portion of the said dust-ladened air to the feed end of the pulverizing apparatus, an inverted cloth bag, the open end of which is adapted to extend over the upper open end of the separating chamber, a ring in the upper end of said bag, and supporting means for the upper end of said bag.

12. A dust collector comprising a separating chamber open at the top and provided with a discharge orifice at the bottom, a pipe for introducing dust-ladened air into the separating chamber, an inverted cloth bag, the open end of which surrounds the upper open end of the separating chamber, a ring in the upper end of the bag, means for supporting the upper end of said bag, and means for intercepting a portion of the air introduced into said separating chamber and returning the same to the pulverizing apparatus.

13. A dust collector comprising a separating chamber open at the top and provided with a discharge orifice at the bottom, a partition across said chamber formed with a central opening, a pipe having a substantially tangential opening into the said separating chamber below the partition and adapted to introduce dust-ladened air into said chamber, an element pervious to air arranged over the open end of the separating chamber, and means for intercepting a portion of the air introduced into said separating chamber and returning the same to the pulverizing apparatus.

14. A dust collector for pulverizing apparatus comprising a separating chamber open at the top and provided with a discharge orifice at the bottom, a partition across said chamber formed with a central opening, a pipe adapted to conduct dust-ladened air from the pulverizing apparatus to said separating chamber below the partition, which has a substantially tangential discharge into the separating chamber, an element pervious to air arranged over the open end of the separating chamber, and a pipe communicating with the separating chamber above the partition and adapted to return a portion of the air from said chamber to the pulverizing apparatus.

15. A dust collector comprising a separating chamber open at the top and provided with a discharge orifice at the bottom, a centrally apertured partition in said chamber, means for introducing dust-ladened air into said chamber below said partition, an element pervious to air arranged over the open end of said separating chamber, a pipe leading from said chamber above said partition and adapted to return a portion of the air in said chamber to said introducing means, and a valve in said pipe between said chamber and said introducing means.

ROBERT A. LACHMANN.
ALBERT W. RAYMOND.
WILLIAM B. SENSEMAN.